UNITED STATES PATENT OFFICE.

JOHN B. BEALE, OF RUSH CENTRE, KANSAS.

METHOD OF CUTTING AND PREPARING BROOM-CORN.

SPECIFICATION forming part of Letters Patent No. 274,702, dated March 27, 1883.

Application filed November 21, 1882. (No specimens.)

*To all whom it may concern:*

Be it known that I, JOHN B. BEALE, of Rush Centre, in the county of Rush and State of Kansas, have invented certain new and useful Improvements in Cutting and Preparing or Finishing Broom-Corn, of which the following is a full, clear, and exact description.

My invention consists in a novel method of cutting and preparing or finishing broom-corn, as hereinafter fully described, and pointed out in the claim.

In carrying out my improved method I first cut the broom-corn in the field or row and drop it in bunches short enough to be conveniently handled. This is done by a Marsh or other harvester or reaper using a grain, grass, or other like sickle capable of being raised or lowered, by lever or otherwise, to cut the stalk at the required height, which may be any desired distance below the brush. This cutting in the row by machine not only insures regularity and expedition, but results in a great saving of labor, which, where labor is scarce and time limited, is very important. After the corn has been thus cut it is shocked in rows and its tops covered with canvas to dry, and when partially dry it is passed through a thrashing-machine to remove the seed, after which it is recut by any suitable "sizing-machine" into lengths desired for bales or baling, the butts being adjusted even into line to secure regularity of cut. The recut corn, having the seeds removed, is then put into sheds to further dry, and after being sufficiently dried is then conveyed to any suitable roughened cylinder or booting-machine for removing the boot or top leaf from the corn, and which its previously-dried condition provides for being done with great facility and dispatch without cutting into or injuring the stalk or stem. After this it is packed into bales.

By the above-described process the broom-corn is prepared and finished much more expeditiously and with very much less labor than is ordinarily necessary.

Having thus described my invention, what I claim as new, and desire to secure by Letters Patent, is—

The herein-described method of cutting and preparing or finishing broom-corn, consisting in cutting it in the row, partially drying it, removing the seed, cutting it into regular lengths, further drying it, and finally booting or taking off the top leaf, as set forth.

JOHN B. BEALE.

Witnesses:
WILLIAM JAMES HAYS,
JOHN I. ROWLEN.